United States Patent [19]
Dixon et al.

[11] 4,056,251
[45] Nov. 1, 1977

[54] LIGHTWEIGHT PAD FOR SEMI-RIGIDLY SUPPORTING ELECTRICAL TRANSFORMERS

[76] Inventors: Jimmie D. Dixon, 7146 W. Bluefield, Peoria, Ariz. 85345; Ralph C. McCannon, 3841 W. Vista Ave., Phoenix, Ariz. 85021

[21] Appl. No.: 683,720

[22] Filed: May 6, 1976

Related U.S. Application Data

[63] Continuation of Ser. No. 203,519, Dec. 1, 1971, abandoned, which is a continuation-in-part of Ser. No. 158,383, June 30, 1971, abandoned.

[51] Int. Cl.² .................... H02B 5/00; B65D 19/24
[52] U.S. Cl. .................................. 248/19; 248/346; 336/65
[58] Field of Search ............... 248/8, 19, 20, 22, 24, 248/358 R, 346, 350; 267/149, 151; 336/65; 52/626, 630; 108/51

[56] References Cited

U.S. PATENT DOCUMENTS

| | | | |
|---|---|---|---|
| 1,811,881 | 6/1931 | Dina | 248/23 |
| 2,699,599 | 1/1955 | Potcher | 52/630 X |
| 2,792,164 | 5/1957 | Cauffiel | 108/51 X |
| 3,142,162 | 7/1964 | Herndon et al. | 248/20 X |
| 3,151,712 | 10/1964 | Jackson | 52/630 X |
| 3,239,185 | 3/1966 | Sweeney et al. | 248/358 R |
| 3,260,974 | 7/1966 | Specht et al. | 336/65 X |
| 3,334,850 | 8/1967 | Jackson et al. | 248/19 |
| 3,404,642 | 10/1968 | Belcher et al. | 108/51 |
| 3,511,191 | 5/1970 | Barry et al. | 108/51 X |
| 3,603,272 | 9/1971 | Ditges | 108/51 |

*Primary Examiner*—J. Franklin Foss
*Attorney, Agent, or Firm*—Cahill, Sutton & Thomas

[57] ABSTRACT

A lightweight plastic transformer pad having upper and lower load bearing walls which are separated by a structurally integrated matrix of transverse support walls extending upwardly from the periphery of an array of apertures in the lower load bearing wall.

5 Claims, 9 Drawing Figures

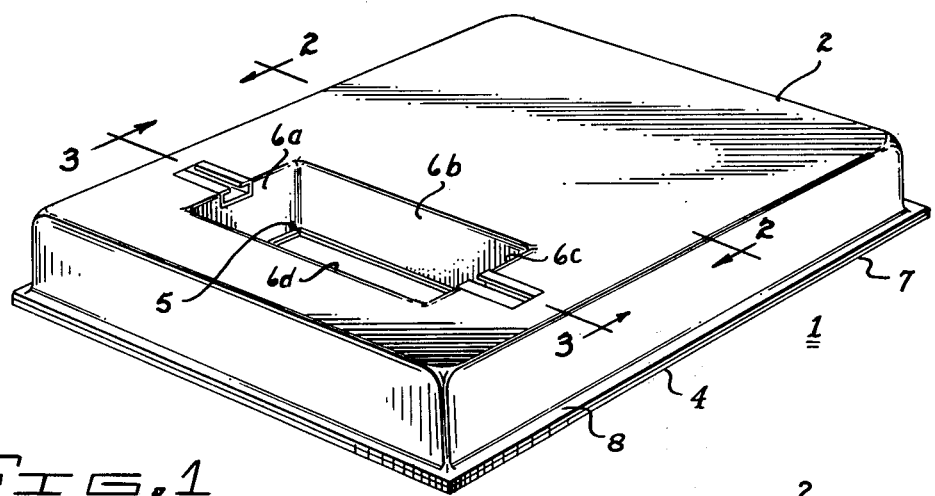
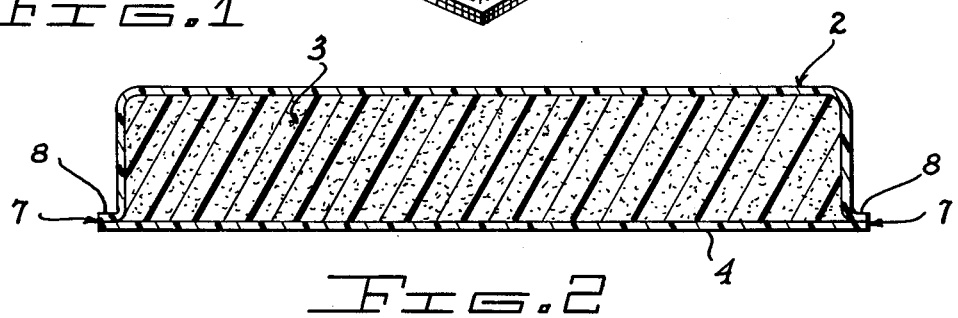
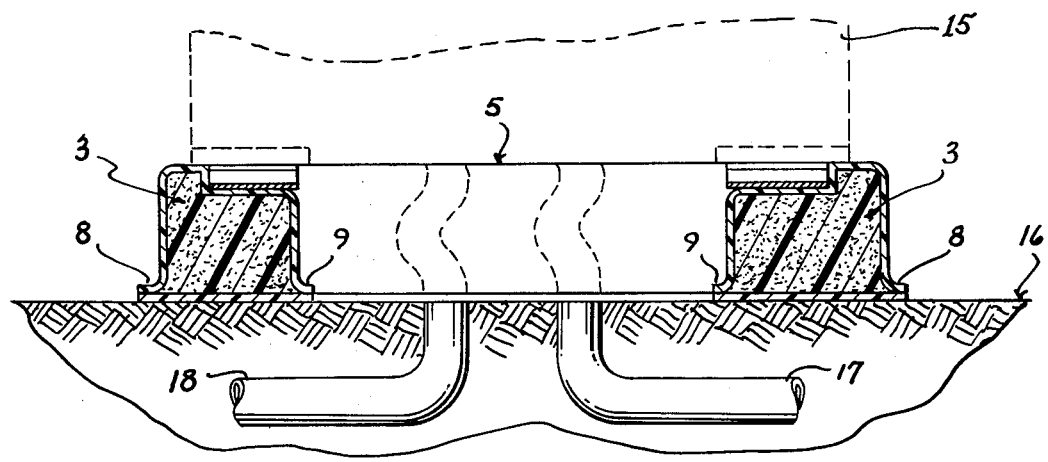
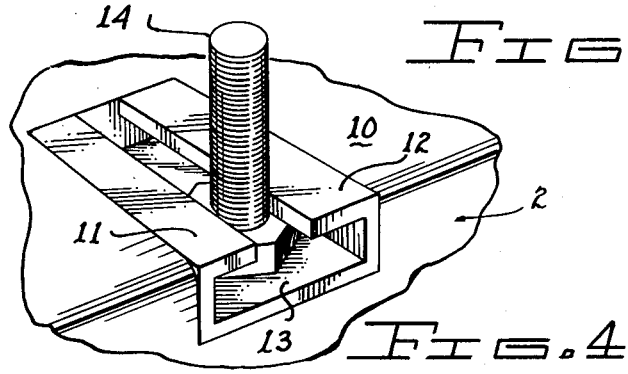

INVENTOR.
RALPH C. MC CANNON
JIMMIE D. DIXON
BY

ATTORNEYS

LIGHTWEIGHT PAD FOR SEMI-RIGIDLY SUPPORTING ELECTRICAL TRANSFORMERS

This application is a continuation of our co-pending application Ser. No. 203,519, now abandoned, filed Dec. 1, 1971, which in turn is a continuation-in-part of our application Ser. No. 158,383, filed on June 30, 1971, now abandoned.

This invention relates to transformer support means and, more specifically, to transformer pads used in applications where electrical utilities are placed underground.

It has been long known in the pertaining art that it is necessary to place electrical transformers used in conjunction with underground electrical utilities upon some sort of support structures rather than directly on the ground. These support structures are commonly referred to as transformer pads and have universally been constructed of steel reinformed concrete.

In the past there have been three basic reasons for placing a cement pad between the surface of the ground and the transformer. First, cement pads have been used to provide a larger surface in contact with the ground. Frequently, the bottom side of the transformer is uneven and, if placed on the ground surface, would result in excessive or uneven settling of the transformer as the soil below compacts from the weight of the transformer.

The second reason for using cement pads has been to raise the metal transformer off the ground and thereby minimize its exposure to moisture and ground water, which frequently create problems of corrosion and short circuiting.

Finally, by providing a substantial central aperture in the cement pad, it has been possible to accommodate slack in the connecting underground cable, thereby easing installation and relieving tension on the cables while fully enclosing the cables.

There are a number of problems and inconveniences associated with the manufacture and installation of steel reinforced concrete transformer pads.

The manufacture of cement pads does not adapt itself to mass production techniques. A large number of special cement molds, which are difficult to use, must be fabricated. Steel reinforcement rods and connecting wires must be cut to size and suspended within the unsolidified concrete. Vibrating or other compaction equipment must be utilized to assure proper concrete density and freedom from air pockets. Many hours of highly skilled (and highly paid) labor are required to construct the cement forms, prepare the steel and work the cement. Frequently the bearing surfaces of the concrete pad are not perfectly parallel and rarely are they as smooth as would be desired. Frequently, caulking must be applied along the juncture of the transformer's bottom surface and the top surface of the cement pad to compensate for unevenness in the pad's top surface. Because the cement pads are extremely heavy, ancillary equipment, such as a crane, is required to lift the pads from their mold, stack the pads in storage, move the pads to a truck bed, remove the pads and stack same at the construction site, and finally to place and align the pad at the point of ultimate installation. Moving and handling of the cement pads inevitably results in structural cracks and chips. In some cases this damage renders the concrete pad useless. In other instances, undetected cracks, which later fill with dirt or water, lead to the ultimate deterioration of the cement pad as a result of forces exerted by thermal contraction and expansion of the pad. In areas accustomed to high summer temperature, such as the desert southwest, the body of the cement pad may expand against a dirt-filled crack and as a result further open the crack allowing for the introduction of additional dirt while providing a base against which subsequent expansion cycles may exert additional destructive forces. At latitudes frequented by hard winter freezes, water may collect and freeze. The expansion of the water upon freezing exerts forces which tend to further force the crack open.

One of the largest installation expenses associated with cement transformer pads, besides transportation costs, arises from the necessity of having a crane or other mechanical device at the construction site for the purpose of transferring the cement transformer pad into its ultimate position over the underground electrical cables. Two men are generally required to place the transformer pad in position: one man to operate the crane and one man to guide the pad into position. However, because the transformers used in such applications are themselves extremely heavy, there is no real reason for requiring that the pad be of substantial density or weight.

Accordingly, it is an object of the present invention to provide a transformer pad which will fulfill the requirements which in the past have been placed on transformer pads and to do so while precluding most, if not all, of the problems associated with prior art steel reinforced transformer pads.

The principal object of the present invention is to provide a lightweight transformer pad which may be readily manufactured through mass production techniques and which will allow for a substantial reduction in the per unit and installation costs typically associated with transformer pads.

It is another object of the present invention to provide a transformer pad having a semi-rigid construction which will allow for slight structural deformation and thereby uniformly transfer forces from an irregular transformer surface to the ground and which will serve to absorb and dissipate vibration energy generated by the operation of the transformer.

Still another object of the present invention is to provide a transformer pad having a hard, relatively smooth, surface which is unsusceptible to penetration by moisture or to cracking, but which may be readily color-impregnated to integrate with the surrounding environment.

In one preferred embodiment of the invention, a plastic transformer pad of unitary construction includes upper and lower load bearing walls which are separated by a matrix of support walls extending upwardly from the periphery of apertures in the lower load bearing wall to the inner surface of the upper load bearing wall. The transformer pad is provided with an open passageway through which electrical cables are passed from the ground to the transformer and is further provided with imbedded channels for slidably receiving the heads of transformer mounting bolts.

The invention is pointed out with particularity in the appended claims, however, other objects and advantages, together with the function of the invention, may be better understood by reference to the following detailed description taken in conjunction with the following illustrations wherein:

FIG. 1 is a perspective view of a transformer pad embodying the present invention.

FIG. 2 is a sectional view of the transformer pad shown in FIG. 1, taken at section 2—2.

FIG. 3 is a sectional view of the transformer pad shown in FIG. 1 taken at section 3—3. The sectional view is shown in relation to a transformer and the surface of the ground.

FIG. 4 shows one embodiment of a bolt receiving channel which may be embedded in the upper surface of the transformer pad to facilitate securing the transformer thereto.

Figure 5:
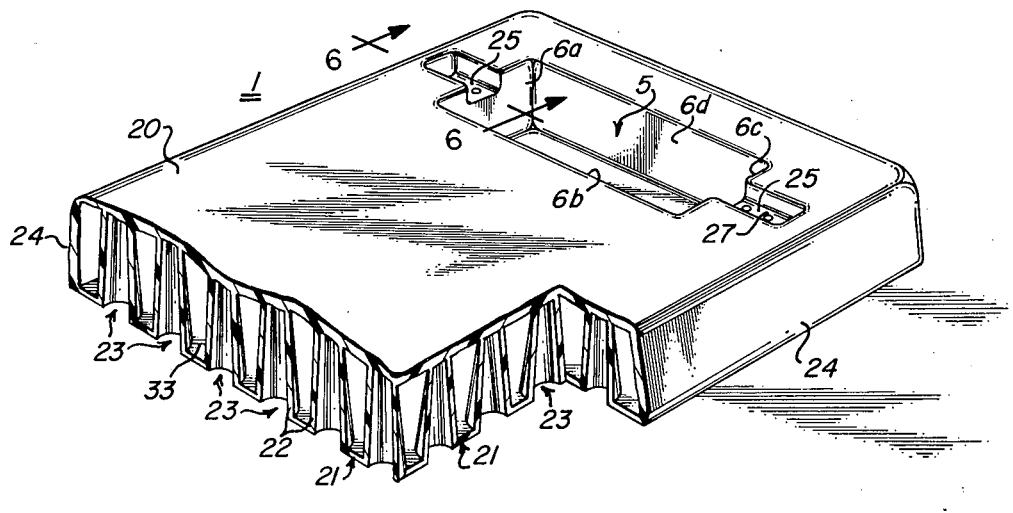
FIG. 5 is a perspective sectional view of a transformer pad representing another embodiment of the invention wherein transverse support walls extend conically upward from circular apertures in the lower load bearing wall of the pad.

One embodiment of the invention will now be described in detail. Referring first to FIGS. 1 and 2 it is seen that the transformer pad 1 is composed of two basic structural elements, an upper surface 2 which defines a generally rectangular volume or cavity 3 and a lower surface 4 which provides a closure on the rectangular cavity 3 defined by the upper surface 2. Both the upper surface 2 and the lower surface 4 may be formed from fiberglass reinforced plastic or one of the many other synthetic materials available on the market.

Referring to FIGS. 1 and 3, it is seen that an internal, generally rectangular passageway 5 is formed through the transformer pad 1. Passageway 5 is defined by internal walls 6a, 6b, 6c, 6d which are integral with and continuations of the upper surface 2. A corresponding rectangular opening is provided in the lower surface 4.

Bearing surfaces 7 are provided around the periphery of the upper and lower surfaces 2 and 4 through the formation of a right angle flange 8 at all points along the external lower edge of the upper surface 2 and through the formation of a corresponding right angle flange 9 at the lower portion of internal walls 6a through 6d.

The enclosed volume 3 formed from the upper surface 2 and the lower surface 4 is filled with a heat expansible polyurethane foam material which is chemically compatible with the fiberglass reinforced plastic material used to form the upper and lower surfaces 2 and 4.

A pair of steel channel members 10 are imbedded in the surface of the upper surface 2. As shown in FIG. 4, the channel members 10 are comprised of upper flanges 11 and 12 and a lower surface 13. A mounting bolt 14 is slidably engaged within each of the channel members 10 and extends vertically therefrom through the longitudinal slot defined by the edges of flanges 11 and 12. The internal dimension of the channel member 10 is of approximately the same dimension, but somewhat larger than the head of the bolt 14 so as to prevent turning of the bolt when the transformer is secured to the pad.

The channel members 10 allow for variations in transformer dimensions and provide points of stress relief necessitated by the substantially different coefficient of thermal expansion associated with the metallic transformer 15 and the non-metallic transformer pad 1.

FIG. 3 shows the relation of transformer 15 to the pad 1 and the surface of the ground 16. Underground cables 17 and 18 are also shown. As may be seen in FIG. 3, the passageway 5 provides a cavity within which surplus lengths of cable may be accumulated to facilitate installation of the transformer and to provide stress relief for the cables themselves.

Transformer pads embodying the present invention may be readily manufactured by mass production techniques. The upper surface 2 may be formed through known plastic techniques. The lower surface 4 may be simply cut from a flat sheet of fiberglass reinforced plastic and a rectangular opening corresponding to the passageway 5 may then be punched or sawed in the appropriate location. Alternatively, the lower surface 4 may also be molded with the opening properly located.

The upper surface 2 is then placed upside down in a heated mold. A quantity of heat expansible polyurethane foam material is then poured into the cup-like volume 3 formed by the inversion of upper surface 2. The lower surface 4 is then set in place and the top of the heat mold is secured over the lower surface. As heat is introduced into the mold, the foam material expands and completely fills all internal portions of the cavity 3. The foam material also seeks to escape along the bearing surfaces 7 formed by the lower surface 4 and the right angle flanges 8 and 9.

The forces exerted by the expansion of the foam material assure uniform distribution of the material throughout the cavity 3 and along bearing surfaces 7. As was pointed out, it is desirable that the foam material used to fill the cavity 3 be chemically compatible with the plastic material used to construct upper and lower surfaces 2 and 4. This allows not only for an effective structural connection at bearing surfaces 7 but also for an effective seal at this point against the entrance of moisture.

The ultimate density of the resultant foam may be varied simply by introducing more or less of the expansible material. In situations where transformed pads are to be used in conjunction with extremely heavy transformers, it is desirable to introduce a greater quantity of the expansible foam material to assure greater structural strength across the surface of the transformer pad.

It should be noted that the right angle flanges 8 and 9 not only serve to define bearing surfaces 7 but also add to the structural rigidity of the upper surface 2.

In some applications it may be desirable to color impregnate the exterior of the upper surface 2 to provide better integration with the ultimate environment. This may be done simply by introducing appropriate pigmentation into the plastic material comprising the upper surface 2.

A number of other manufacturing techniques may be employed in the production of transformer pads embodying the present invention. For example, the expansive forces exerted by the polyurethane foam may be used to simultaneously press the upper surface 2 into an appropriately configured mold.

It has also been found that, by the use of centrifugal molding techniques in conjunction with certain plastic foam materials, a transformer pad embodying the elements of this invention may be inexpensively produced. Transformer pads formed by this technique exhibit a sharp density gradient at their external upper and lower surfaces, although they are formed from only one type of material. Thus, rather than incorporating a discrete external skin of a material and a different internal filler material such as expanded foam, devices manufactured through centrifugal molding techniques exhibit the characteristics of a hard external skin and a less dense internal filler material. It is understood, of course, that in such case the cross sectional representation of a transformer pad embodying the present invention would be slightly different than shown in FIGS. 2 and 3 in that the cross hatching would run in only one direction and the line representing the internal surface of the upper and lower elements 2 and 4 would represent a point at which the material density changed significantly.

According to another technique which may be used in the formation of this type of transformer pads a glass fiber mat is first placed into a mold having the characteristics of upper surface 2. Thereafter, an appropriate quantity of expansible foam material is poured into the mold. A second glass fiber mat is placed across the top of the mold after which the mold is closed. The foam material then expands to fill the mold and permeate the glass fiber mats. The resultant structure has a rigid external skin and a lower density internal filler.

Transformer pads enbodying the form of the invention shown in FIG. 2 may also be made by inserting pre-formed styrofoam sections in the volume 3 formed by upper and lower surfaces 3 and 4. These and other construction techniques are set forth in the pamphlet entitled "Reinforced Plastics" published by Owens-Corning Fiberglass Corporation (Publication No. 5-PL-3101, May 1968).

FIG. 5 shows an embodiment of the invention wherein an upper load bearing wall 20 is separated from a lower load bearing wall 21 by a plurality of transverse support walls 22.

Lower load bearing wall 21 has an array of circular apertures 23 extending therethrough. Support walls 22 are in the form of hollow cones tapering upward from the periphery of the circular apertures 23 and terminating at the lower surface of the upper load bearing wall 20.

The array of circular apertures 23 extends in a basically uniform pattern over the entire lower load bearing wall 21, and accordingly, the conical support walls 22 are distributed throughout the internal portion of transformer pad 1. Transverse external walls 24 are integral with the upper load bearing wall 20 and serve to close off the internal portion of transformer pad 1. A passageway 5, similar to the passageway of the embodiment shown in FIG. 1, is formed by transverse walls 6a, 6b, 6c and 6d which extend from the periphery of an internally disposed, rectangular aperture in the lower load bearing wall upwardly to a corresponding rectangular aperture in the upper load bearing wall.

Recessed areas 25 are provided for receiving channel members 10 as shown and described in conjunction with FIG. 4.

It has been found that the embodiment of the invention shown in FIG. 5 may take the form of a unitary monolithic structure through rotationally molding techniques. When such techniques are employed, the upper portions of conical support walls 22 are integral with the lower surface of the upper load bearing wall 20.

Although transverse load bearing walls 22 may be virtually vertical, as is shown and will be described in conjunction with FIGS. 7 and 8, it is preferred that there be a slight decreasing taper away from the periphery of apertures 23 in order to facilitate the removal of the finished transformer pad 1 from the mold.

Figure 6:
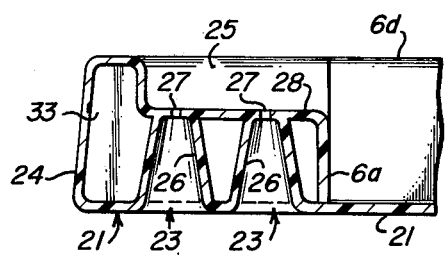
FIG. 6 is a sectional view taken at section 6—6 in FIG. 5 and showing the bolt receiving means in relation to the pad.

Although the array of apertures 23 is basically uniform over the lower load bearing wall 21, certain variations are of course required in the vicinity of passageway 5. Similarly, as shown in FIG. 6, it is necessary that support cones 26 be provided to support and secure channel members 10 (see FIG. 4).

Holes 27 may be provided in the lower surface 28 of recessed areas 25. Appropriate bolts or threaded members welded to the bottom of channel members 10 (FIG. 4) may be passed through holes 27 and secured in recessed areas 25 by appropriate flat washers and nuts.

Figure 9:
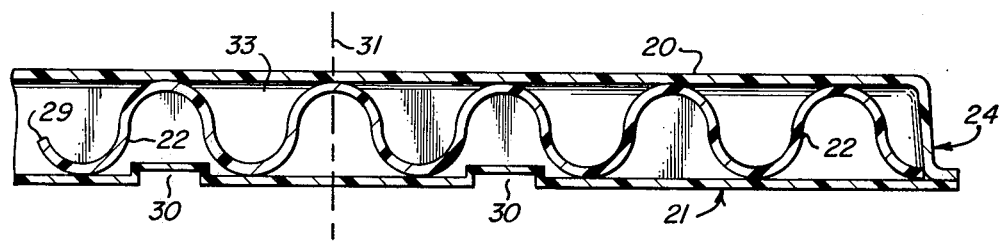
FIG. 9 is still another embodiment of the invention wherein the transverse support walls are provided by a corrugated insert.

FIG. 9 represents still another embodiment which the invention may assume. In FIG. 9 upper load bearing wall 20 and lower load bearing wall 21 are separated not only by side walls 24 but also by internally disposed transverse walls 22. In this embodiment, transverse walls 22 are provided by one or more heavily corrugated insert members such as members 29 which are placed within the external walls of transformer pad 1 prior to securing lower load bearing wall 21 to side walls 24.

Recessed areas 30 may be uniformly placed with respect to center line 31 of transformer pad 1 (as shown in FIG. 9). Recessed areas 30 act as lift receiving means which, for example, may receive the spaced prongs of a fork lift. Such recessed areas are advantageous in those cases where the manufacturer of the electric transformer also supplies the transformer pad which will be ultimately used at the installation site. In such instances, it is possible to make use of pad 1 not only for the ultimate mounting of the electric transformer but also as a shipping pad.

Figure 7:
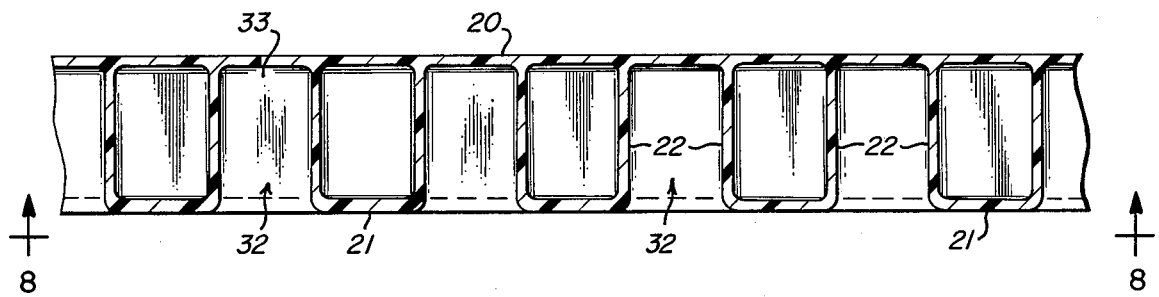
FIG. 7 is a sectional view showing another embodiment of the invention wherein the transverse support walls extend upwardly from rectangular apertures in the lower load bearing wall of the pad.
Figure 8:
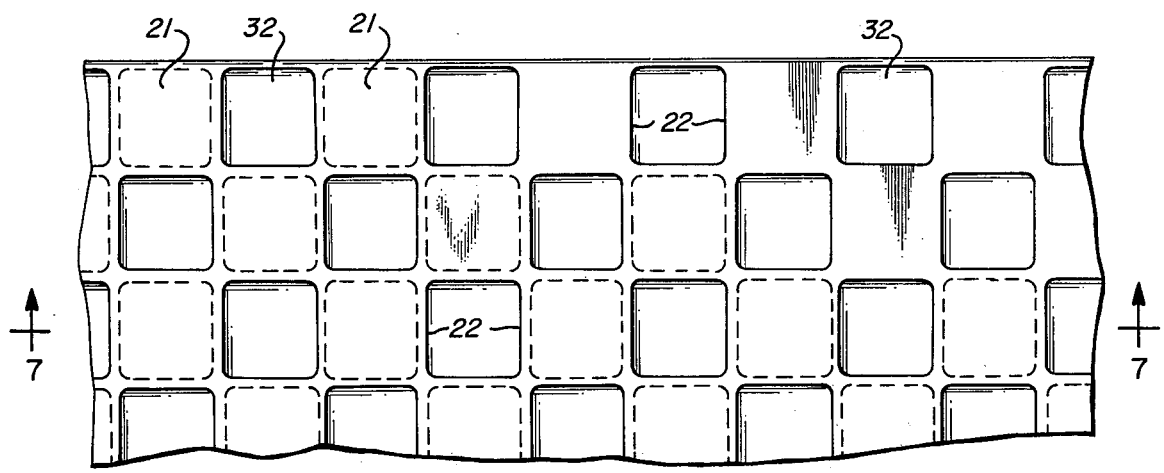
FIG. 8 is a partial bottom view of the embodiment of the invention shown in FIG. 7 as viewed in the direction 8—8.

A further embodiment of the invention, illustrative of the many variations which may be realized while remaining within the spirit of the invention, is shown in FIGS. 7 and 8.

FIG. 7 is a sectional view taken at section 7—7 in FIG. 8. FIG. 8, in turn, is a partial bottom view of the structure shown in FIG. 7.

In the form shown, a plurality of rectangular apertures 32 extend through lower load bearing wall 21. Transverse support walls 22 extend upwardly to the interior surface of upper load bearing wall 20 from the periphery of the rectangular apertures 32.

It will be apparent to those skilled in the art that an array of rectangular apertures similar to rectangular apertures 32 may also be provided in the upper load bearing wall 20 of the transformer pad 1 shown in FIG. 7 and FIG. 8. In such case, FIG. 8 would represent not only a bottom view of the structure shown in FIG. 7 but also a top view. It will be further appreciated that the various internally disposed cavities 33 defined by side walls 24 and internally disposed transverse support walls 22 in FIGS. 5 through 9 may be then filled with an appropriate heat expansible polyurethane foam material such as has been described in conjunction with FIGS. 1 through 3.

Furthermore, an almost endless variety of aperture arrays and transverse support wall configurations may be utilized while remaining within the spirit of the invention.

The use of transformer pads embodying the present invention has been found to result in a substantial reduction in the costs associated with manufacturing and installation. A single workman can readily manipulate such transformer pads and thus does not require the assistance of a crane or other mechanical device. Because the transformer pads are manufactured through molding techniques, the upper and lower surfaces are of uniform smoothness. The fiberglass reinforced plastic material used to form the upper and lower surfaces eliminates the cracking and chipping which has previously resulted in the deterioration of cement transformer pads.

The semi-rigid structure of transformer pads made according to the present invention allows for the absorption of vibration energy generally associated with low frequency electrical transformers. The dissipation of this energy into an adjacent structure is an important consideration in extending the life of the transformers themselves.

The plastic molding techniques employed in the manufacture of transformers embodying the present invention result in the precise placement of channel members 10 in relation to the upper wall 20 or surface 2 of the transformer pad 1. Heretofore, similar channels have been placed in cement structures by hand and have frequently been so misaligned that new holes must be drilled in the base of the transformer to allow for proper mounting of the transformer on the cement transformer pad.

Polyester resins have been employed to manufacture transformer pads in accord with the present invention because these plastics have favorable mechanical, chemical and electrical properties, the resultant dimensional stability, their low cost and ease of handling. However, epoxy resins may also be used. Epoxy resins also have excellent mechanical properties, dimensional stability and chemical resistance and are generally used to provide one of the characteristics in the finished part. They are more expensive and generally more difficult to handle than the polyester resins.

During the installation of transformer pads, great care must be exercised to insure that the pads are level and bear uniformly on the surface of the ground. This is generally accomplished by first setting the transformer pad in place and checking it with a level. Sand or earth is then selectively placed under the transformer pad to compensate for any irregularity. Where concrete transformer pads are employed, repeated lifting of the pad during this leveling process is accomplished by a crane. As has been pointed out, this requires at least two workmen and the presence of an expensive piece of equipment. As can be readily seen, transformer pads incorporating the present invention are light and easily manipulated thus substantially eliminating all the previous problems in handling and in particular those problems arising during the leveling process.

Although the invention has been described in its preferred embodiments, it is to be understood that the words which have been used are words of description rather than limitation. It has been pointed out that a number of materials may be employed and a number of processes used to achieve the ultimate structure. Other materials and other processes may also be used while remaining within the scope of the present invention.

We claim:

1. A lightweight pad providing a semi-rigid vibration dampening support for maintaining an electrical transformer in spaced relation to a generally horizontal plane, said pad comprising in combination:

a. an integral, monolithic superstructure of synthetic, polymeric members, comprising:
      i. a platform member for contactingly receiving said transformer;
      ii. a base member parallel to said platform member, said base member having a plurality of spaced apertures therein;
      iii. lateral wall members extending peripherally of said pad and enclosing the volume between said platform and said base member;
      iv. a network of hollow, frusto-conical shaped members located between said lateral wall members and extending between said platform member and said base member, said frusto-conical shaped members tapering inwardly from said base member to said platform member and providing frusto-conical-shaped cells having open bases defined by the apertures in said base member and tops defined by, and integral with, said platform member; all of said members cooperating to define an internally disposed volume; said network of frusto-conical shaped members being substantially regular in pattern;
      v. a transversely extending channel having opposing endwise openings through said base and said platform members to provide physical access between said transformer and said horizontal plane;
   b. low density filler material substantially filling said internally disposed volume; and,
   c. means for connectively receiving said electrical transformer in secured relation to said pad.

2. A lightweight pad providing a semi-rigid vibration dampening support for maintaining an electrical transformer in spaced relation to a generally horizontal plane, said pad comprising in combination:

a. an integral, monolithic superstructure of synthetic, polymeric members, comprising:
      i. a platform member for contactingly receiving said transformer;
      ii. a base member parallel to said platform member, said base member having a plurality of spaced apertures therein;
      iii. lateral wall members extending peripherally of said pad and enclosing the volume between said platform and said base member;
      iv. a network of walled members located between said lateral wall members and extending between said platform member and said base member, said walled members tapering inwardly from said base member to said platform member and providing hollow cells having open bases defined by the apertures in said base member and tops defined by, and integral with, said platform member; all of said members cooperating to define an internally disposed volume; said network of walled members being substantially regular in pattern;
      v. a transversely extending channel having opposing endwise openings through said base and said platform members to provide physical access between said transformer and said horizontal plane;
   b. low density filler material substantially filling said internally disposed volume; and,
   c. means for connectively receiving said electrical transformer in secured relation to said pad.

3. The pad of claim 2 wherein said apertures are circular.

4. The pad of claim 2 wherein said apertures have at least four sides.

5. The pad of claim 2 wherein said apertures are four-sided.

* * * * *